United States Patent [19]
Brower et al.

[11] Patent Number: 4,876,976
[45] Date of Patent: Oct. 31, 1989

[54] AUTOMATIC QUILTING MACHINE AND METHOD FOR SPECIALIZED QUILTING OF PATTERNS WHICH CAN BE CONTROLLED BY A REMOTE JOYSTICK AND MONITORED ON A VIDEO SCREEN INCLUDING PATTERN DUPLICATION THROUGH A REPROGRAMMABLE COMPUTER

[75] Inventors: David Brower, Tarzana; Thomas K. Jernigan, Canoga Park, both of Calif.

[73] Assignee: TD Quilting Machinery, Burbank, Calif.

[21] Appl. No.: 247,696

[22] Filed: Sep. 22, 1988

Related U.S. Application Data

[63] Continuation-in-part of Ser. No. 220,734, Jul. 18, 1988.

[51] Int. Cl.$^4$ .................. D05B 21/00; D05B 11/00
[52] U.S. Cl. .................. 112/262.3; 112/266.1; 112/119; 112/121.12
[58] Field of Search ........... 112/119, 117, 118, 121.12, 112/121.11, 103, 457, 262.3, 266.1; 364/470, 400

[56] References Cited

U.S. PATENT DOCUMENTS

| | | | |
|---|---|---|---|
| 1,958,893 | 5/1934 | Kinter | 358/108 X |
| 3,312,184 | 4/1967 | Cash | 112/118 |
| 3,377,968 | 4/1968 | Story | 112/118 X |
| 3,500,777 | 3/1970 | Kalning | 112/118 |
| 3,757,710 | 9/1973 | Landoni | 112/118 |
| 4,188,893 | 2/1980 | Shimazaki | 112/121.11 |
| 4,403,559 | 9/1983 | Hirose | 112/121.12 |
| 4,429,364 | 1/1984 | Maruyama | 112/121.11 X |
| 4,526,166 | 7/1985 | Mannel | 112/121.12 X |
| 4,583,181 | 4/1986 | Gerbe | 364/470 |
| 4,669,405 | 6/1987 | Resta et al. | 112/119 X |
| 4,784,071 | 11/1988 | Sadeh et al. | 112/121.12 |
| 4,798,152 | 1/1989 | Simons et al. | 112/121.11 X |

*Primary Examiner*—Peter Nerbun
*Attorney, Agent, or Firm*—Thomas I. Rozsa

[57] ABSTRACT

An automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction through an automatic joystick. The sewing machine head is mounted on a cross beam which is aligned at the approximate center point of the metal frame on which the fabric is stretched. The needle of the sewing machine head can stitch a pattern into any location in the fabric and the metal frame is moved in any direction relative to the fixed sewing machine head in order to bring the desired stitch location on the fabric into alignment with the sewing machine head. The precise location of the sewing machine needle and fabric is illuminated and a color video camera which is mounted on the cross beam holding the sewing machine head is also focused on this location. The color video camera is connected to a television monitor so that a visual image of the sewing machine needle and fabric as a stitch is being made can be delivered to the monitor. A machine operator can control the movement of the metal frame through positioning by a remote joystick and can see the stitch being made by viewing the monitor.

35 Claims, 3 Drawing Sheets

AUTOMATIC QUILTING MACHINE AND METHOD FOR SPECIALIZED QUILTING OF PATTERNS WHICH CAN BE CONTROLLED BY A REMOTE JOYSTICK AND MONITORED ON A VIDEO SCREEN INCLUDING PATTERN DUPLICATION THROUGH A REPROGRAMMABLE COMPUTER

This is a continuation-in-part of co-pending application Ser. No. 07/220,734, filed on July 18, 1988.

BACKGROUND OF THE INVENTION

1. Field of the Invention

The field of the present invention relates to frame quilting machines which are large table-like structures used to sew patterns into large textile items; in particular bedspreads and quilts. The field of the present invention also relates to industrial sewing machine apparatus and processes used to sew patterns and stitching into large fabrics, which sewing operation is not easily performed on conventional sewing machines. The field of the present invention also relates to machines which include a method of duplicating a selected pattern over an entire bedspread or quilt.

2. Description of the Prior Art

Industrial sewing machine operations are known in the prior art. Patterns and stitching into fabrics is commonly performed on industrial sewing machines. The operator hand guides the fabric between the needle and the sewing machine table and the pattern is sewn into the fabric. This process is practical for small pieces of fabric and is commonly done on piece goods such as garments. When handling larger pieces of fabric such as a roll of fabric, a method known in the prior art is roll to roll sewing. The sewing machine head is located along an X-axis and the material is unwound from a roll and caused to move transverse to the sewing machine head such that the fabric moves along a Y-axis. The sewing machine sews a stitch into the large fabric as the head moving along the X-axis and the fabric moving along the Y-axis intersect each other. The fabric is then wound onto a second receiving roll.

When sewing a very large piece of fabric such as a bedspread or quilt, a frame quilting machine is used. The frame quilting machine comprises a large frame, usually made of metal, onto which the fabric to be sewn is spread. Commonly, the pattern is sewn by a sewing machine guided by a computer into which a predetermined pattern has been programmed. The fabric remains stationary on the frame and the sewing machine head moves along the fabric and stitches in the predetermined pattern.

The current method for computer programmable quilting patterns uses a digitizer/cursor board with a method of plotting patterns. It is also used in the design of patterns and is accomplished on a scaled down version of the patterns. Plotting is accomplished using a mouse for indexing points on an XY axis. The points are programmed and followed through use of the computer. The prior art uses standard patterns which are preprogrammed into the computer and selected individualized pattern which are created as the bedspread or quilt is on the machine.

Sewing machines and various frame quilting apparatus and processes have previously been patented. The following is representative of the types of apparatus and processes which have been patented:

1. U.S. Pat. No. 4,188,893 issued to Shimazaki in 1980 for "Device of Detecting Cloth Feeding Amount In Sewing Machines".
2. U.S. Pat. No. 3,377,968 issued to Story in 1968 for "Material Holding And Guide Attachment For Sewing Machine".
3. U.S. Pat. No. 4,429,364 issued to Maruyama et al. in 1984 for "Sewing Machine-Pattern Data Processor".
4. U.S. Pat. No. 1,958,893 issued to Kintner et al. in 1934 for "Photosensitive Apparatus".
5. U.S. Pat. No. 4,583,181 issued to Gerber et al. in 1986 for "Fabric Flow Related System".
6. U.S. Pat. No. 3,500,777 issued to Kalning et al in 1970 for "Quilting Apparatus".
7. U.S. Pat. No. 3,757,710 issued to Landoni in 1973 for "Automatic Quilting Machine".
8. U.S. Pat. No. 3,312,184 issued to Cash in 1967 for "Quilting Machine of the Endless Guide Track Type".
9. U.S. Pat. No. 4,526,116 issued to Mannel in 1985 for "Method and Arrangement To Control An Automatic Embroidery Machine".

U. S. Pat. No. 4,188,893 to Shimazaki discloses an apparatus for test running a pattern by matting the X-Y grid on an oscilloscope in order to test the pattern to be sure that the proper pattern is run before actual cloth is used (and wasted).

U. S. Pat. No. 1,958,893 to Kintner et al. discloses the use of a video camera in conjunction with a missile projecting apparatus. The camera has a photosensitive eye for regulating the activity of the apparatus, wherein the position of the photo-sensitive eye and the projecting device are so related that the missiles are projected in accordance with the position of the target.

U. S. Pat. No. 3,377,968 to Story illustrates a particular type of guiding apparatus for holding material and guiding it relative to the sewing machine.

U. S. Pat. No. 3,500,777 to Kalning et al. illustrates what is now the well known quilting machine with multiple sewing heads.

U. S. Pat. No. 3,312,184 to Cash illustrates a quilting machine which allows independent movement of the quilt holder in any direction. The machine is capable of sewing two or three reproductions of the same sewing line into the same quilt at the same time.

U. S. Pat. No. 4,526,116 to Mannel discloses an automatic quilting machine wherein a video camera is used to pick up certain patterns of a motif carrier and transmit them to the sewing machine. Here, the pattern is automatic from a predetermined pattern.

U. S. Pat. No. 3,757,710 to Landoni discloses an automatic quilting machine where the heads can be changed so that certain patterns of stitching paths can be alternated with one or more types of different patterns.

U. S. Pat. No. 4,429,364 issued to Maruyama involves a computer operated pattern input for a sewing machine.

U. S. Pat. No. 4,583,181 issued to Geber discloses a device to assist an operator in dealing with flaws encountered during the spreading of web material to be cut.

None of the known prior art apparatus including those disclosed in the above patents enables an operator to individually hand sew an individual pattern into a large piece of fabric such as a bedspread or quilt while remaining at a remote position from the fabric. In present day operations, such hand sewn operations require the operator to physically be above the quilting table, which can be almost 12 feet square, and hand sew the pattern into the fabric. This is a very expensive and time consuming process. The only known apparatus for sewing patterns into the quilt is disclosed in the Mannel patent wherein a video camera is used to pick up certain patterns of a motif carrier and transmit them to the sewing machine. Here, the pattern is automatic from a predetermined pattern. More expensive and finer quilts and bedspreads are those which have individual patterns sewn into them and can be advertised as having "hand sewn" individual patterns. Therefore, there is a significant need for an apparatus and process which enables hand sewn individual patterns to be sewn into large fabrics such as quilts and bedspreads in an efficient manner where the worker or workers do not have to be guided above the large laid out fabric and hand sew the patterns into the fabric.

None of the prior art patents discloses an individualized reprogrammable computer used in conjunction with an individual selected hand sewn pattern wherein the pattern is first hand design while the quilt and bedspread is on the frame and thereafter the hand designed individualized pattern is programmed into the computer to be repeated.

In addition, in the prior art, the computer controls all functions including the sewing functions of the machine, every stitch in the movement, and the X-Y movement function. This creates an extremely complex operation when it is necessary to reprogram the computer. None of the prior art embodiments selectively breaks down the three functions into individualized computer program modes so that reprogramming of one element does not require reprogramming the entire system.

SUMMARY OF THE PRESENT INVENTION

The present invention relates to an automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction through an automatic joystick. The sewing machine head is mounted on a cross beam which is aligned at the approximate center point of the metal frame on which the fabric is stretched. The needle of the sewing machine head can stitch a pattern into any location in the fabric and the metal frame is moved in any direction relative to the fixed sewing machine head in order to bring the desired stitch location on the fabric into alignment with the sewing machine head. The precise location of the sewing machine needle and fabric is illuminated and a color video camera which is mounted on the cross beam holding the sewing machine head is also focused on this location. The color video camera is connected to a television monitor so that a visual image of the sewing machine needle and fabric as a stitch is being made can be delivered to the monitor. A machine operator can control the movement of the metal frame through positioning by a remote joystick and can see the stitch being made by viewing the monitor. Therefore, instead of being required to hand over the frame quilting machine to observe the pattern being stitched, the operator can view the entire stitching process from a remote location by viewing the stitch on the video monitor and can direct the movement of the table relative to the fixed sewing machine head in order to position the fabric for successive stitched while remaining at a remote location from the frame quilting machine.

In addition, the present invention also relates to a reprogrammable function integrated into the system wherein the operator first manually traces the desired pattern using the existing joystick system. At the end of this step, the traced pattern is stored into the memory of the computer as a digitalized image of the pattern. The operator then indicates the position of the machine sewing head for all the repeat quilting areas by physically driving and marking those positions and programming this into the computer. At the end of this step, the computer will have generated and stored a digitalized map of the entire area to be quilted. In the third step of the process, the operator will command the start of the automated quilting generated process and the computer will cause the machine to go to the marked locations on the bedspread or quilt and repeat the individualized pattern which was created by the operator.

Further, the present invention also relates to a system wherein the sewing machine function is controlled by one computer usually located on the sewing machine head and the quilting table motion in the X-direction, Y-direction, and X-Y direction is controlled by a separate computer.

In general, this is a frame quilting machine. A bedspread, comforter, quilt, etc. is stretched securely on a metal frame. It is placed on an X-Y positioning table for movement controlled through a sewing machine. The sewing machine has been modified and mounted on a steel frame (two cross beams top and bottom) that can accommodate twelve feet by twelve feet six inches of stitching dimensions. Of course it can be made larger or smaller. The machines has been engineered and built to satisfy increased production needs of manufacturers who supply "custom, hand-guided, or outline quilted patterns". The five key elements of the present invention are: (a) sewing and auxiliary functions; (b) X-Y movement of the table controlled by a remote joystick; (c) video camera and monitor; (d) the electronic coordination of movement and sewing speeds relative to direction and distance of travel of the remote joystick; (e) a reprogrammable computer into which the individualized hand generated pattern which has been traced by the operator into a bedspread or quilt through the joystick and viewing the movement on the video monitor can be programmed into the computer and after at least one point for each subsequent pattern duplication has been marked into the computer, the individualized pattern can be duplicated in each desired location of the bedspread or quilt through activation of the reprogrammable computer.

It has been discovered, according to the present invention, that if a video camera connected to a television monitor is focused on the location of the sewing needle and bedspread or quilt location where the needle is stitching the thread into the bedspread or quilt, and the area is further illuminated to provide a clear view, an operator can view the entire stitching process from a remote location and does not have to spend time consuming effort in positioning himself over the frame quilting machine to determine the position of the stitch.

It has further been discovered, according to the present invention, that if a frame quilting machine can be moved relative to a fixed sewing machine head in the X-direction, the Y-direction or any X-Y combination directed by a remote operating means such as a joystick, and the frame quilting machine comprises a metal table or frame on which a bedspread or quilt is stretched such that the surface area of the bedspread or quilt is open and unobstructed, and the metal frame can move relative to and between a pair of cross beams which hold a sewing machine head and plate, then an operator can cause the bedspread or quilt to be precisely stitched in any desired pattern by moving the metal frame or quilting table relative to the fixed cross beams housing the sewing machine components in any desired direction to arrive at any desired location on the bedspread or frame where a stitch or pattern is to be sewn. If the area of the sewing machine head and stitch is further illuminated by a source of light and visually displayed by a video camera fixed to one of the cross beams and focused on the area of the sewing machine needle and bedspread or quilt, and the picture is transmitted to a monitor, then an operator can be positioned at a remote location and observe the precise formation of the stitch and direction of the pattern being sewn into the bedspread or quilt and can cause the quilting table to move relative to the sewing machine head in order to bring any desired location of the bedspread or quilt into alignment with the sewing machine head so that any desired hand selected pattern or individual pattern can be sewn into the large bedspread or quilt in an efficient manner.

It has additionally been discovered, according to the present invention, that if an operator can control the movement of the frame table on which the fabric is stretched and can see the precise location of the stitch being made in the fabric from a remote location, the amount of training time required to teach the operator to use the present system is much less than the time used to teach an operator to sew with the prior art frame quilting machines. In addition, the risk of injury to the operator is significantly reduced and the speed of production is significantly increased.

It has also been discovered, according to the present invention, that if the system includes a reprogrammable computer into which the specific design is programmed as it is being generated by the operator, the individualized pattern can be subsequently restitched over and over at desired locations through activation of the stitch mode of the reprogrammable computer, thereby eliminating the necessity of the operator having to continuously hand guide the pattern at each new location.

It has further been discovered, according to the present invention, that if one computer controls the sewing function of the sewing machine and a second computer controls the movement of the quilting table, then reprogramming either computer is greater simplified.

It is therefore an object of the present invention to provide an apparatus by which an operator can remain at a remote location from a large frame quilting machine and cause a precise hand selected pattern to be sewn into the large bedspread, comforter, quilt, or other fabric which is held on the metal frame or table of the frame quilting machine.

It is another object of the present invention to provide an apparatus which enables frame quilting for specialized hand selected patterns to be quickly and efficiently performed with a minimum amount of training time of the operator.

It is a further object of the present invention to provide an apparatus which can accommodate computerized pattern quilting of a predetermined computer generated patters and also accommodate specialized hand selected patterns, or any combination thereof, in the same unit.

It is an additional object of the present invention to increase the rate of production of hand guided patterns sewn into large fabrics such as bedspreads or quilts.

It is an additional object of the present invention to enable a hand selected pattern to be sewn into a large fabric such as a bedspread or comforter while an operator is positioned at a distance remote from the moving parts of the machine such as the frame table and sewing machine needle, to thereby significantly reduce the risk of injury to an operator.

It is an additional object of the present invention to provide a system for automatically duplicating the individualized patterns to eliminate the necessity of hand guiding the individualized pattern at each new location where it is stitched into the bedspread or quilt.

It is a further object of the present invention to provide a system wherein the computers which control the sewing machine function and the quilting table movement are segregated to thereby reduce the effort involved in reprogramming the computers.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
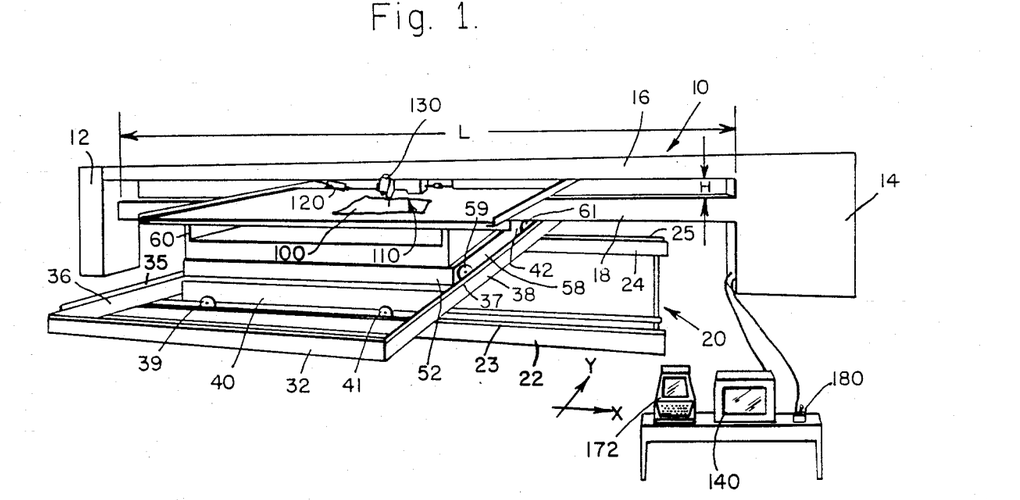
FIG. 1 is a perspective view of the present invention automatic quilting machine for specialized quilting of patterns which can be controlled by a remote joystick and monitored on a video screen.

Referring to FIG. 1, the main structural elements of the present invention automatic quilting machine for specialized quilting of patterns which can be controlled by a remote joystick and monitored on a video screen including pattern duplication through a reprogrammable computer. (hereinafter referred to as "automatic quilting machine") will be discussed first. The entire automatic quilting machine is designated as 10. The main structural member of the automatic quilting machine 10 is a pair of posts of box members, comprising a left box member 12 and a right box member 14. By way of example, the left box member 12 which serves only as a support member can be made of quarter inch plate steel and can have a base which is twenty inches wide by twenty-four inches deep and fifty-two inches tall. The right box member 14 which includes the electronics and motors, as will be described later, in addition to acting as a support member, can also be made of quarter inch plate steel and can have a base which is forty-four inches wide by twenty-four inches deep and fifty-two inches tall. The two support boxes 12 and 14 support a pair of cross beams; an upper cross beam 16 and a lower cross beam 18. Upper cross beam 16 can be made of quarter inch plate steel and can be twenty-four feet long, four inches wide and eight inches tall. Lower cross beam 18 can be made of quarter inch plate steel and can be twenty-four feet long, eight inches wide and eight inches tall. As illustrated in FIG. 1, the two beams 16 and 18 run parallel to each other between support box members 12 and 14, and are separated by a gap "H" which by way of example may be nine and a half inches. The cross beams 16 and 18 are permanently attached to the supporting box members 12 and 14 by conventional means such as welding.

Figure 3:
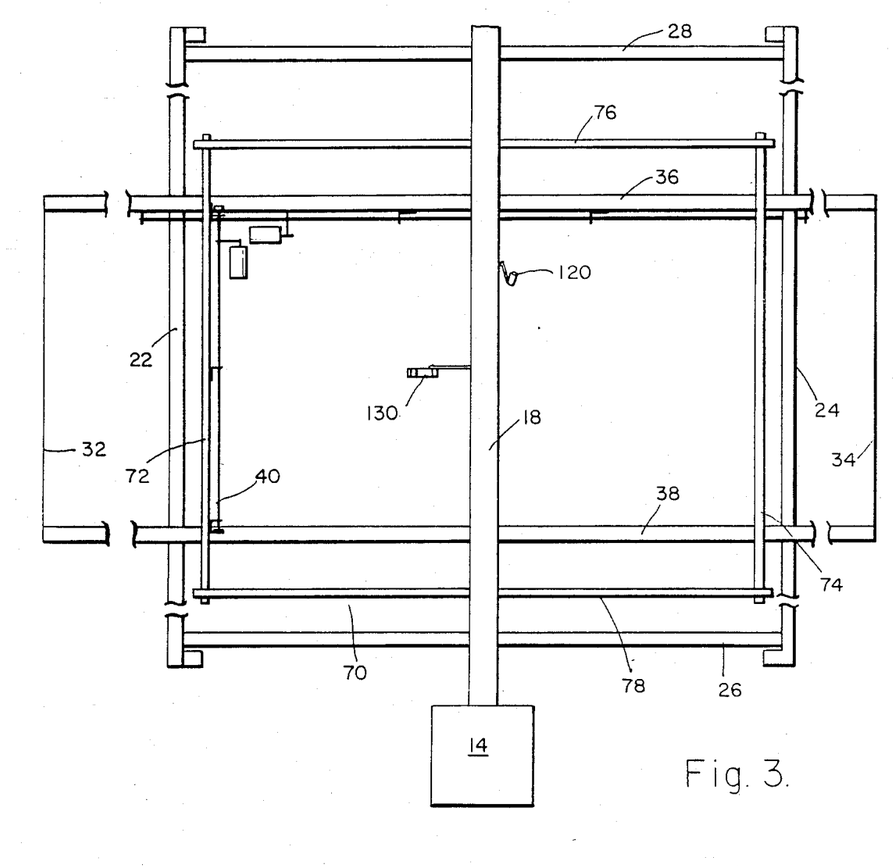
FIG. 3 is a top plan view of the main body of the present invention automatic quilting machine including pattern duplication through a reprogrammable computer.

Referring to FIGS. 1 and 3, on the ground between the supporting box members 12 and 14 and beneath the lowermost cross beam 18 is the base track 20. The base track 20 is comprised of track supports 22 and 24 which support thereon a gear and rack system which will be described in greater later on. Track support 22 further comprises a track 23 on which a pair of rollers may roll. Track support 24 further comprises a track 25 on which a pair of rollers may roll. The track supports 22 and 24 are aligned parallel to each other and are attached by means of transverse spacing members 26 and 28 which also run parallel to each other, thereby forming a generally square base which rests on the ground. Resting immediately above the base track 20 is a first movable support member track 30. The first movable support member track 30 is comprised of a pair of parallel X-direction beams 32 and 34 and a pair of Y direction beams 36 and 38 which are connected together for form a generally rectangular frame. The frame comprised of members 32, 34, 36 and 38 of first movable support member 30 support transverse roller members 40 and 42. Transverse roller member 40 is supported between Y direction beams 36 and 38 and is generally parallel to X-direction beams 32 and 34 and is aligned directly over track support 22. Transverse roller member 40 further comprises a pair of rollers 39 and 41. Transverse roller 42 is supported between Y-direction beams 36 and 38 and is generally parallel to X-direction beams 32 and 34 and is aligned directly over track support 24. Transverse roller member 42 further comprises a pair of rollers (not shown). First movable support track 30 can move in the X direction as the rollers on transverse roller members 40 and 42 can roll on the track 23 contained on track support 22 and on track 25 contained on track support 24 respectively. Y-direction beam 36 further comprises a track 35 and Y-direction beam 38 further comprises a track 37. Y-direction beams 36 and 38 further comprise gear and rack assemblies, as will be described later.

Resting immediately above the first movable support member track 30 is a second movable support member track 50. The second movable support member track 50 is comprises of a pair of parallel X-direction beams, one of which is shown at 52 and a pair of Y direction beams, one of which is shown at 58, which are connected together form a generally rectangular frame. The Y-direction beams on the second movable support member track 50 each further comprise a pair of rollers which enable the second movable support track 50 to move in the Y direction. Y-direction beam 58 comprises a pair of rollers 59 and 61 which move on track 37 and Y-direction beam 56 comprises a pair of rollers (not shown) which move on track 35.

Second movable track member 50 further comprises four posts at its corners, two of which, 60 and 62 are shown in FIG. 1. The four posts support quilt table 70 which is comprised of X-direction table beams 72 and 74 and Y direction table beams 76 and 78, connected together by means such as welding. X-direction table beam 72 is supported on posts 60 and 62 and X direction table beam 74 is supported on the two opposite posts (not shown). Y-direction table beams 76 and 78 are supported on the two X-direction table beams 76 and 78 adjacent their respective ends, as shown in FIGS. 1 and 3. The two X-direction table beams 72 and 74 are parallel to each other and the two Y-direction table beams 76 and 78 are parallel to each other.

As illustrated in FIGS. 1 and 3, the posts on second movable track member 50 support the table beams such that the table beams 76 and 78 pass through gap H between cross beams 16 and 18 and table beams 72 and 74 can pass through the gap H is the Y direction movement is of sufficient length. In operation, a bedspread or quilt 100 is stretched across the table beams 72, 74, 76, and 78, which by way of example can form a table surface of approximately twelve feet in the X-direction by twelve and a half feet in the Y-direction, such that the quilt 100 is supported at its edges by the four table beams 72, 74, 76 and 78 which result in a fully accessible quilt over its entire interior upper and lower surface. The table beams are caused to move in the X-direction by first movable support track 30 as the rollers on transverse roller members 40 and 42 move along tracks 23 and 25 respectively. The length "L" of gap "H" is preferably at least twice the length of the two X-direction table beams 72 and 74. In this way, the entire X-direction area of the quilt table 70 can be reached by the centermost position along the cross beams 16 and 18. The table beams are caused to move in the Y direction by second movable support member track 50 when the rollers on its Y-direction beams move along tracks 35 and 37. The length of tracks 35 and 37 is at least twice the length of the two Y-direction table beams 76 and 78. In this way, the entire Y-direction area of the quilt table 70 can be reached by the centermost position along the cross beams 16 and 18. Through this combination of X and Y movements, the entire area of the quilt table 70 and the quilt 100 spread thereon can be reached by the centermost position of cross beams 16 and 18. In the preferred starting position, the quilt table 70 is centered relative to the cross beams 16 and 18 and can move in any X-Y direction relative the centermost position of the cross beams.

Figure 4:
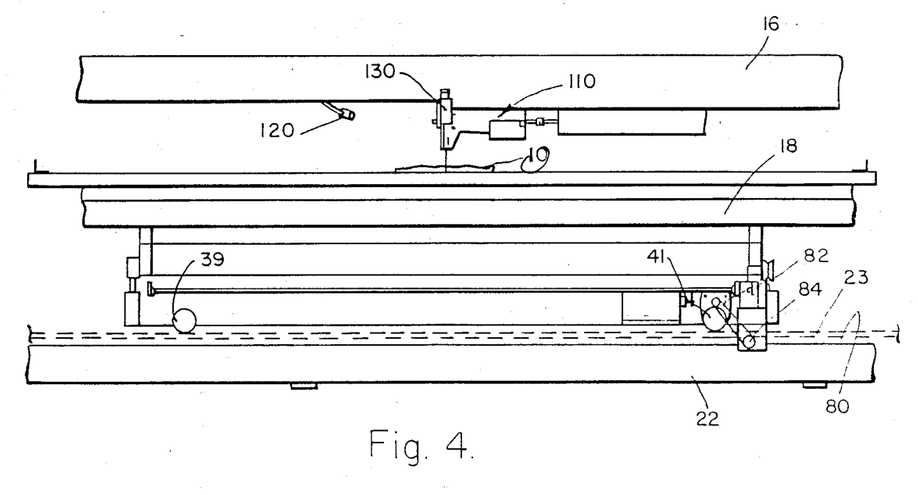
FIG. 4 is a front elevational view of the present invention automatic quilting machine including pattern duplication through a reprogrammable computer.

The quilt table 70 can be caused to move in the X and Y directions as previously described by numerous conventional types of means, such as a gear and rack assembly. One such gear and rack assembly is illustrated in FIG. 4. Track support 22 supports track 23 on which rollers 39 and 41 can roll in the X-direction. Track support 22 further contains on its interior surface a rack assembly 80 having a conventional multiplicity of teeth which can accommodate a gear. Transverse roller member 40 further supports a rotatable gear 82 which is caused to rotate by a conventional gear drive mechanism 84 having smaller gears driven by a belt to drive the rotatable gear 82. The gear drive mechanism is driven by a conventional linkage hookup to a drive motor which causes a motor shaft to rotate and thereby drive the gear drive mechanism 84 which in turn causes the rotatable gear 82 to rotate. When the rotatable gear rotates in the clockwise direction, the rotatable gear moves along the rack assembly 80 and causes the transverse roller member 40 (and opposite transverse roller member 42) to move to the right in the X-direction. When the rotatable gear rotates in the counterclockwise direction, the rotatable gear moves along the rack assembly 80 and causes the transverse roller member 40 (and opposite transverse roller member 42) to move to the left in the X-direction. It will be appreciated that a comparable rack and gear assembly is supported on Y-direction beam 38 and Y-direction beam 58, thereby enabling Y-direction beams 58 (and the opposite Y-direction beam on second movable support member track 50) to move back and forth in the Y-direction.

It will be appreciated that conventional adjustment modifications can be incorporated into this system. For example the overall height of the quilt table 70 can be adjusted up and down by creating slidable adjustments in the posts (60, 62 and to two opposite posts) in order to adjust the height of quilting table 70 relative to the cross beams 16 and 18.

Figure 5:
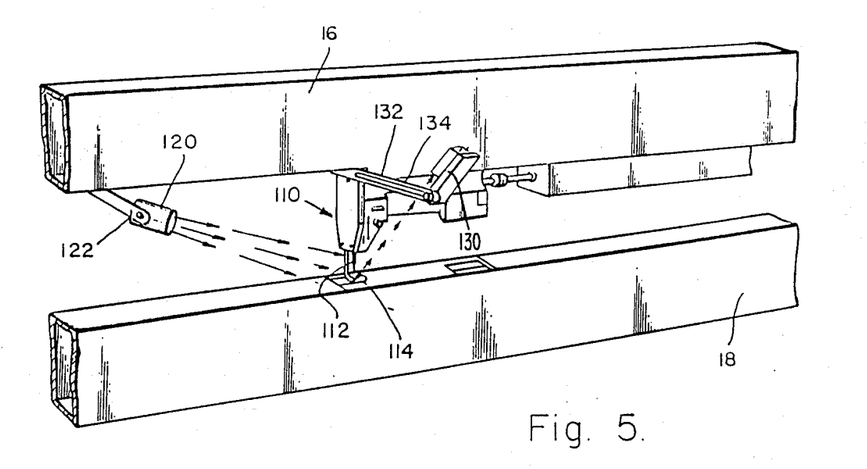
FIG. 5 is an enlarged perspective view of the front portion of the main support beam and attachments thereto.
Figure 6:
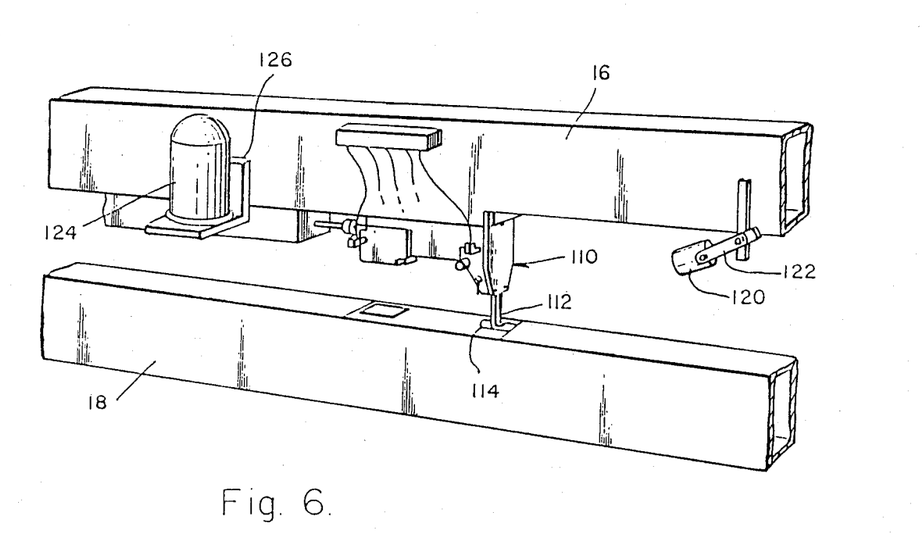
FIG. 6 is an enlarged perspective view of the rear portion of the main support beam and attachments thereto.

Referring to FIGS. 4, 5, and 6, a sewing machine head 110 is bolted stationary to upper cross beam 16. Any industrial machine sewing head which is suitable for the intended sewing purpose can be incorporated with the present invention. However, to achieve the goal of the present invention is segregating the computer controlling the sewing functions from the computer controlling the quilting table movement, it is preferred that a sewing machine head having its own computer be used. By way of example, one type of sewing machine head which can be used with the present invention is the Mitsubishi Industrial Sewing Machine Model LS2-180 high speed, single needle lockstitch sewing machine. A mecroprocessor connected to this type of sewing machine head provides many auxiliary functions such as control of needle position, presser foot lift, undertrim, and tension release disk. The sewing machine head 110 is attached to the underside of upper cross beam 16 such that the sewing needle 112 is at the approximate center of cross-beam 16. In this manner, the sewing needle 112 can reach any portion of the quilt table 70 and quilt 100 thereon by the X-Y movement of the quilt table, as previously discussed. The sewing machine plate 114 is formed into the top of lower cross beam 18 such that the plate 114 is aligned with the needle 112, as best illustrated in FIG. 6.

A source of light 120 is attached, preferably to the upper cross beam 16 and directed such that the beam of light falls directly on the intersection area between the sewing needle 112 and the sewing machine plate 114. The source of light 120 may have an adjustment means 122 so that the direction of the beam can be altered, depending upon need. In this way, the area being stitched is brightly illuminated. A bobbin 124 is supported by a frame member 126 attached to one edge of upper cross beam 16. Thread 128 is wound on the bobbin 118 and is guided by conventional means through the sewing machine head 110 and to the needle 112.

A color video camera 130 is mounted to an adjustable mounting bracket 132 which in turn is mounted to the upper cross beam 16. By way of example, adjustable mounting bracket 132 may contain an internal slide 134 and the video camera can be positioned along the slide at any desired location and rotated such that the focus of the color video camera 130 is directly at the intersection of the sewing needle 112 and the sewing machine plate 114. In this way, since the area is illuminated by the source of light 120, a clear picture of the sewing machine needle 112 performing a sewing or stitching operation can be picked up by the color video camera 130. The color video camera 130 is a high quality full color resolution camera. While a black and white video camera can be used, a color video camera is preferred for distinguishing shades in the fabric pattern. Extra wide angle lenses and/or telephoto lenses may be attached to the color video camera in order to display larger areas or more precise minute areas, as required for the specific operation.

The color video camera 130 is in turn connected to the input of a color monitor 140 and the monitor is connected to an alternating current power source 150. When the color monitor 140 is turned on, the power to the color monitor 140 generates power to the color video camera 130 and the image of the sewing needle 112 and the stitching or sewing operation being performed is picked up by the video camera 130 and transmitted to the color monitor 140 where it can be easily viewed by an operator. Therefore, instead of requiring an operator to be physically above the large quilting table in order to see exactly where the sewing machine needle is stitching a pattern and seeing what pattern is being stitched, the operator merely needs to look at the monitor 140 in order to determine exactly where the needle is located and in what direction it is going so that the subsequent stitches can be accurately guided and made. As with the camera, a black and white monitor can be used, but a color monitor is preferred.

While it would be possible to physically move the quilting table 70 as the needle is sewing the pattern, it is not practical since the table is heavy and could not be moved fast enough by hand to quickly guide the portion of quilt 100 to the area where the sewing needle 112 is sewing the next stitch. Therefore, an automatic electrical system for moving the quilting table 70 and quilt 100 thereon into position for appropriate sewing of the pattern is required. A block diagram of the electronics for performing this operation is presented in FIG. 2. A source of alternating current power 150 energizes the entire system. As previously discussed, in one connection, the source of alternating current power 150 is connected to the monitor 140 which in turn energizes the video camera 130. In a second connection, the alternating current source is connected to an alternating current to direct current transformer 160. The transformer 160 is in turn connected to a process controller or computer 172 which provides control functions for movement of the quilting table beams in the X-direction, the Y-direction, and therefore the X-Y direction both for the initial pattern being traced and for subsequent duplication of the pattern as will be discussed hereafter. The AC to DC transformer 160 is also connected to a joystick 180 which in turn is connected to a joystick controller 170. The joystick 170 has an X-axis input and a Y-axis input into the process controller or computer 172. The joystick controller 170 is in turn also connected to the sewing machine 110. The process controller 172 has an X-direction output which in turn is connected to an X-axis controller 162 which in turn is connected to the X direction motor 164 is which a direct current motor. The process controller 172 also has a Y-direction output which in turn is connected to a Y-axis controller 166 which in turn is connected to the Y direction motor 168 is which a direct current motor. In the block diagram of FIG. 2, the process controller 172 is also shown connected to an external memory 174. It is also within the spirit and scope of the present invention for the process controller to have an internal memory.

Figure 2:
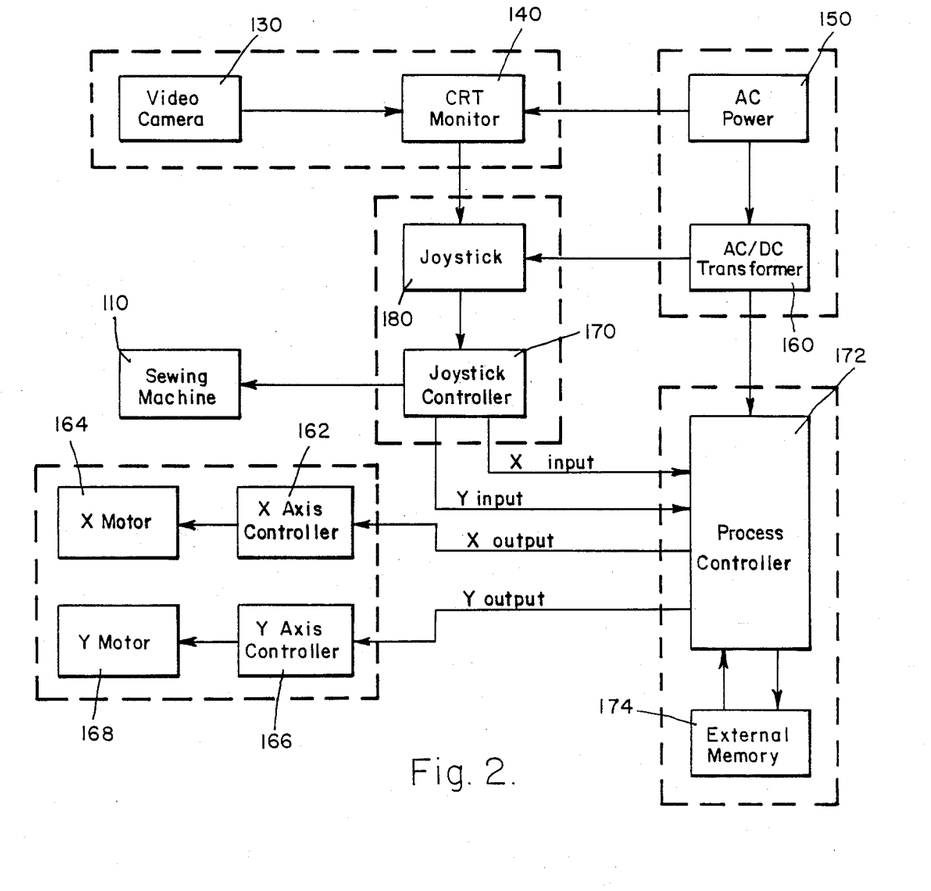
FIG. 2 is a block diagram of the components of the electronic control components of the present invention automatic quilting machine including pattern duplication through a reprogrammable computer.

The joystick 180 is a bi-directional joystick with a variable speed range to permit the operator to make a highspeed and low-speed moves of the table. By way of example, the high-speed may be set to a maximum diagonal speed of approximately twenty-five feet per minute. Limit switches may be included to prevent the table's overtravel. The joystick 180 through the joystick controller 170 can also be used to control the speed of the sewing needle 10. The DC motors 164 and 168 may be variable speed motors which are coupled to the quilt table through conventional drive belts, gears and racks, as previously described. The mechanical portion of the drive system can be suitable for adaptation to a computer controlled servo system and can therefore be controlled by the process controller 172. The electronic control components including the AC to DC transformer 160, the X-axis controller 162, the Y-axis controller 166, the X-direction motor 164, the Y-direction motor 168 and the joystick controller 170 can all be housed in the larger supporting box member 14. In the illustration of FIG. 1, the process controller 172 is shown adjacent the monitor 140. It is also possible to house the process controller 172 and its external memory 174 within larger supporting box member 14.

Therefore, through use of the present invention, an operator can hold the joystick 180 in his/her hand and watch the color video monitor 140. With the color video camera 130, equipped if desired with a wide angle or telephoto lens, focusing on the area where the sewing needle 112 is sewing the quilt 100, and the area illuminated by the source of light 120, the operator receives a detailed and clear view of the sewing needle as it is sewing the stitch into the quilt. Through use of the joystick 180 and joystick controller 170 connected to the sewing machine head 110, the speed of the needle can be varied according to the stitch desired. An individual pattern can be sewn as if by hand since the quilting table 70 can be guided in an X-direction or Y-direction or combination X-Y diagonally oriented direction by use of the joystick 180 which through the joystick controller 170 feeds the commands through the X-input and Y-input into the process controller 172 which in turn processes the data and through its X output and Y output feeds the information into the X axis controller and Y axis controller respectively to in turn activate the X-direction motor and the Y-direction motor to engage the gear and rack system and cause the quilting table 70 to be moved in the X-direction, the Y-direction, and the XY combined direction, as previously described. Therefore, by watching the image on the monitor 140, the operator can cause the quilting table 70 and the quilt 100 thereon to be moved in any desired direction relative to the sewing needle 112 so that an individual pattern of any desired shape and size can be sewn into the quilt 100. A microprocessor in the joystick controller 170 helps to control the speed of sewing and the movement of the bedspread or quilt affixed to the quilting table 70. As the quilting table 70 is moved, the bedspread or quilt 100 passes through the gap H and since the bedspread or quilt 100 is held only by its edges, the sewing machine needle 112 can sew through the bedspread or quilt 100 at any location in an unimpeded manner.

The apparatus is designed with two modes which can be selected by an appropriate switch on the joystick 180 or on the process controller 172. The first mode is the manual mode which is the manual operating mode of the machine wherein the operator has complete control of the X-Y motion functions of the machine and can trace each individual pattern as it is being sewn on the quilt, as described above. The apparatus also has the capability of duplicating the original hand designed pattern and any multiplicity of locations on the quilt or bedspread 100 through a trace and duplicate mode. The operator first selects the "Trace" made and while using the joystick 180 traces the pattern on the quilt 100, as just described. As the pattern is being traced and sewn, the process controller is having the pattern encoded in its external memory 174 (or internal memory) and will generate and store in its memory a digitalized image of the pattern. Next, through the use of the joystick 180, the operator will cause the table 70 to be moved in any multiplicity of X and Y directions to arrive at various locations on the quilt 100. As the sewing machine head 110 arrives at a location where the desired pattern is to begin, a command will be encoded in the process controller memory to mark this location for the traced pattern to be sewn. The various starting location are marked at each desired point in this manner. In its simplest form, only one point per pattern need be marked. It is also possible to mark a series of points for each pattern when more complex patterns are involved. At the end of this step, the process controller 172 will have generated and stored a digitalized map of the area to be quilted. In the third step, which is a "Duplicate" mode, the operator will command the start of the automated quilting generated process and the machine will then duplicate the selected pattern at each location which has been marked. This third step can be executed independently of the first two steps as long as the selected memory bank has learned the stitch information. Therefore, once a hand selected sewn pattern has been made and stored in memory, this pattern can be sewn on the quilt and then re-sewn on subsequent quilts, without the necessity of the operator having to hand trace the pattern over and over again. As will be appreciated, a library of standard stitch patterns can be embedded into the process controller to be called up by the operator at any future time.

In addition, an important design element of the present system is that the process controller 172 which controls the X-Y movement of the quilting table and the trace pattern which is stored in the computer's memory as a digitalized pattern is separate from the computer on the sewing head 110 which controls the sewing needle stitch and speeds. This is accomplished by using a sewing head which has its own independent computer such as a Mitsubishi Industrial Sewing Machine Model LS2-

180 high speed, single needle lockstitch sewing machine. In this way, if it is necessary to add new stitch pattern into memory, it is a much simpler task to add the new stitch and program commands to the process controller 172 without also having to reprogram the stitching and other needle functions on the sewing machine head.

Because of the independent computer capability of the machine with one computer controlling the X-Y movement and a second computer on the sewing machine controlling the sewing and stitching functions, the operator can trace a straight line pattern into the X-Y process controller 172 and a software program command to the X-Y process controller 172 will enable the pattern to be automatically modified into a zig-zag or any other desired pattern. This is a valuable modification which cannot be easily achieved with prior art systems where the computer for the sewing machine and X-Y movement is integrated into one large computer. The software program for such prior art systems is too complicated. In such prior art systems, each stitch and each movement for each stitch would need to be programmed. In the prior art you have for example 5 stitches per inch and 4,000 linear inches per fabric so 20,000 stitches and movements per stitch must be programmed. With the present invention, only the table movement needs to be programmed because the stitch pattern is a separate independent program controlled by a separate computer on the sewing machine.

Through use of the present invention, the rate of production is at least three to five times greater than that of hand-guided skilled operators. The training time required to teach the operator to use the present system is only one week, as opposed to four to six months for a conventional system. The present system can even be used by a non-skilled operator instead of the high-skilled operators required to operate present day systems. The high resolution color video camera and monitor allow the operator to see close-up views of the sewing operation from any distance. The risk of injury to the operator is significantly reduced since the operator is positioned at a remote location from the sewing needle and the moving table and therefore does not come in contact or near contact with moving parts.

The present system can also be combined with well known preprogrammed computer controlled systems. The attachment from the joystick interface card 170 can be attached to a computer which receives preprogrammed patterns. The computer can be programmed to move the quilting table 70 and quilt 100 relative to the sewing needle 112 and can be therefore programmed to stitch a preprogrammed pattern into the quilt or bedspread. Therefore, the preprogrammed patterns can be stitched into part of the quilt or bedspread and the precise individual hand sewn patterns can be sewn into another portion of the bedspread. After the programmed patterns are completed, the computer is disconnected and the joystick reconnected to the joystick interface card and the precise hand sewing is performed. Of course, the hand sewing can be done first and then the preprogrammed pattern can be sewn afterward by attachment of the computer.

Defined more broadly, the present invention is a frame quilting machine comprising: (a) a frame member for retaining a fabric; (b) said frame member mounted on a structure which can be moved in the X-direction, the Y-direction, or any X-Y combination direction; (c) a first cross beam extending horizontally over said frame member; (d) a second cross beam aligned parallel to said first cross beam and extending horizontally beneath said frame member; (e) a first motor to generate movement of said frame in the X-direction; (f) an X axis controller connected to said first motor; (g) a second motor to generate movement of said frame member in the Y-direction; (h) a Y axis controller connected to said second motor; (i) a remote control apparatus for controlling the movement of said structure and said frame member to enable the frame member and the fabric retained thereon to be moved horizontally in the X-direction, the Y-direction, and any combination X-Y direction between said first cross beam and said second cross beam; (j) said remote control apparatus connected to a source of power; (k) a sewing machine head attached to said first cross beam and having a source of thread; (l) a sewing needle extending from said sewing machine head and positioned to sew threads into said fabric while the frame member and structure move underneath said first cross beam and above second cross beam; (m) a sewing machine plate attached to said second cross beam and aligned with said sewing machine head and sewing needle; (n) a source of illumination focused on the intersection of said sewing machine plate needle and fabric; (o) a video camera movably secured to said first cross beam and focused on the intersection of said sewing machine needle and fabric; (p) said video camera connected to a monitor; (q) a process controller having an X input and a Y input connected to said remote control apparatus, the process controller also connected to said X axis controller through an X input and to said Y axis controller connected to said source of power; (s) whereby an operator may view the needle sewing thread into the fabric on the video monitor and may control the movement of the frame and fabric relative to the sewing needle by said remote control apparatus through generation of commands input into the process controller which in turn generates commands to the first motor through the x axis controller and to the second motor through the Y axis controller.

Said process controller further comprises a memory to receive and store information of a pattern traced through the remote control apparatus, whereby the remote control apparatus can be used to trace a pattern to be sewn into the fabric, cause the structure and the frame member to move relative to the sewing needle to trace the selected pattern and further to mark locations where the pattern is to be sewn into the fabric, and the pattern and locations can be stored in the memory of the process controller to have the process controller subsequently cause the apparatus to sew the desired pattern at each marked location on the fabric.

In the preferred embodiment, said source of power is an alternating current source which is connected to an alternating current to direct current transformer.

In the preferred embodiment, said remote control apparatus is a joystick and a joystick controller, wherein the joystick is connected to the source of power and is also connected to the joystick controller which in turn is connected to the process controller through the X input and Y input of the process controller.

The source of illumination can be attached to said first cross beam. The video camera is preferable to a color video camera. In an optional feature, the video camera is equipped with a wide angle lens. The monitor is preferably a color monitor. The apparatus may further comprise a programmable computer connected to said apparatus whereby a preprogrammed pattern is directed by the computer will cause the second structure to move in a desired pattern relative to said sewing needle. The fabric may be a bedspread or a quilt. In the preferred embodiment, said sewing machine head and said frame member are aligned such that said sewing needle is at the approximate center point of said fabric and said frame member can move relative to said sewing machine head and said sewing needle so as to permit the sewing needle to reach any portion of the surface area of the fabric. The speed of said sewing needle may be controlled by said remote control apparatus. In the preferred embodiment, said sewing machine head is equipped with a computer to control the sewing and stitching functions.

The present invention may be even more broadly defined as an apparatus for sewing thread into fabric comprising: (a) a first structure supporting a sewing machine head having a sewing needle and a source of thread; (b) a second structure supporting the fabric in a position relative to said sewing needle so that thread may be sewn into the fabric; (c) said second structure capable of horizontal movement in the X-direction, the Y-direction, or any combination X-Y direction relative to said sewing needle; (d) means for generating the horizontal movement of said second structure in the X-direction, the Y-direction, or any combination X-Y direction; (e) a video camera focused on the location of the intersection of said sewing needle and said fabric; (f) said video camera connected to a monitor; (g) a remote control apparatus for moving said second structure and the fabric retained thereon relative to said sewing needle so that said sewing needle may sew a pattern with said thread into said fabric; (h) a process controller having an X input and a Y input connected to said remote control apparatus, the process controller also connected to said means for generating horizontal movement of the second structure; and (i) a source of power connected to said remote control apparatus and also connected to said process controller; (j) whereby an operator may view the needle sewing thread into the fabric on the video monitor and may control the movement of said second structure and fabric relative to the sewing needle by said remote control apparatus through generation of commands input into the process controller which in turn generates commands to said means for generating horizontal movement of the second structure.

In the preferred embodiment, said means for generating horizontal movement of the second structure further comprises: (a) a first motor to generate movement of said frame member in the X-direction; (b) an X axis controller connected to said first motor and also connected to an X input in said process controller; (c) a second motor to generate movement of said frame member in the Y-direction; and (d) a Y axis controller connected to said second motor and also connected to a Y input in said process controller;

Said process controller further comprises a memory to receive and store information of a pattern traced through the remote control apparatus, whereby the remote control apparatus can be used to trace a pattern to be sewn into the fabric, cause the second structure and the fabric thereon to move relative to the sewing needle to trace the selected pattern and further to mark locations where the pattern is to be sewn into the fabric, and the pattern and locations can be stored in the memory of the process controller to have the process controller subsequently cause the apparatus to sew the desired pattern at each marked location on the fabric.

In the preferred embodiment, said source of power is an alternating current source which is connected to an alternating current to direct current transformer which in turn is connected to the remote control apparatus and to the process controller.

In the preferred embodiment, said remote control apparatus is a joystick and a joystick controller, wherein the joystick is connected to the source of power and is also connected to the joystick controller which in turn is connected to the process controller through an X input and Y input of the process controller.

The apparatus may further comprise a source of illumination focused on the intersection of said sewing needle and said fabric, which source of illumination is preferably attached to said first structure. A video camera can be movably attached to said first structure.

The sewing machine head may be equipped with an independent computer to control the sewing and stitching functions.

As clearly shown in the above described apparatus, the present invention also encompasses the method of sewing a pattern into a fabric having a large surface comprising: (a) positioning a sewing machine head having a source of thread and a sewing needles relative to said fabric; (b) retaining said fabric on a movable structure which can be made to move in a horizontal direction relative to the sewing needle and which can cause a portion of the surface of the fabric to be reached by the sewing needle so that thread can be sewn into the fabric; (c) obtaining a video image of the intersection of the sewing needle and fabric; (d) controlling the movement of the movable structure relative to the sewing needle by a remote control apparatus and determining the direction of movement based upon the video image of the intersection of the sewing needle and fabric; and (e) storing the information on the movement of the movable structure into the memory of a process controller; (f) whereby the process controller can cause the movement of the movable structure relative to the sewing needle to be subsequently repeated at any multiplicity of locations on the fabric. The method may further comprise illuminating the intersection of said sewing needle and said fabric.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A frame quilting machine comprising:
   a. a frame member for retaining a fabric;

b. said frame member mounted on a structure which can be moved in the X-direction, the Y-direction, or any X-Y combined direction;
c. a first cross beam extending horizontally over said frame member;
d. a second cross beam aligned parallel to said first cross beam and extending horizontally beneath said frame member;
e. a first motor to generate movement of said frame member in the X-direction;
f. an X axis controller connected to said first motor;
g. a second motor to generate movement of said frame member in the Y-direction;
h. a Y axis controller connected to said second motor;
i. a remote control apparatus for controlling the movement of said structure of said frame member to enable the frame member and the fabric retained thereon to be moved horizontally in the X-direction, the Y-direction, and any combination X-Y direction between said first cross beam and said second cross beam;
j. said remote control apparatus connected to a source of power;
k. a sewing machine head attached to said first cross beam and having a source of thread;
l. a sewing needle extending from said sewing machine head and positioned to sew threads into said fabric while the frame member and structure move underneath said first cross beam and above said second cross beam;
m. a sewing machine plate attached to said second cross beam and aligned with said sewing machine head and sewing needle;
n. a source of illumination focused on the intersection of said sewing machine needle and fabric;
o. a video camera movably secured to said first cross beam and focused on the intersection of said sewing machine needle and fabric;
p. said video camera connected to a monitor;
q. a process controller having an X input and a Y input connected to said remote control apparatus, the process controller also connected to said X axis controller through an X input and to said Y axis controller through a Y input; and
r. said process controller connected to said source of power;
s. whereby an operator may view the needle sewing thread into the fabric on the video monitor and may control the movement of the frame and fabric relative to the sewing needle by said remote control apparatus through generation of commands input into the process controller which in turn generates commands to the first motor through the X axis controller and to the second motor through the Y axis controller.

2. A apparatus in accordance with claim 1 wherein said process controller further comprises a memory to receive and store information of a pattern traced through the remote control apparatus, whereby the remote control apparatus can be used to trace a pattern to be sewn into the fabric, cause the structure and the frame member to move relative to the sewing needle to trace the selected pattern and further to mark locations where the pattern is to be sewn into the fabric, and the pattern and locations can be stored in the memory of the process controller to have the process controller subsequently cause the apparatus to sew the desired pattern at each marked location on the fabric.

3. An apparatus in accordance with claim 1 wherein said source of power is an alternating current source which is connected to an alternating current to direct current transformer.

4. An apparatus in accordance with claim 1 wherein said remote control apparatus is a joystick and a joystick controller, wherein the joystick is connected to the source of power and is also connected to the joystick controller which in turn is connected to the process controller through the X input and Y input of the process controller.

5. An apparatus in accordance with claim 1 wherein said source of illumination is attached to said first cross beam.

6. An apparatus in accordance with claim 1 wherein said video camera is a color video camera.

7. An apparatus in accordance with claim 6 wherein said monitor is a color monitor.

8. An apparatus in accordance with claim 1 wherein said video camera is equipped with a wide angle lens.

9. An apparatus in accordance with claim 1 wherein said fabric is a bedspread.

10. An apparatus in accordance with claim 1 wherein said fabric is a quilt.

11. An apparatus in accordance with claim 1 wherein said sewing machine head and said frame member are aligned such that said sewing needle is at the approximate center point of said fabric and said frame member can move relative to said sewing machine head and said sewing needle so as to permit the sewing needle to reach any portion of the surface area of the fabric.

12. An apparatus in accordance with claim 1 wherein the speed of said sewing needle is controlled by said remote control apparatus.

13. An apparatus in accordance with claim 1 wherein said sewing machine head is equipped with a computer to control the sewing and stitching functions.

14. An apparatus in accordance with claim 13 wherein an operator can trace a straight-line pattern into the process controller and a software program in the process controller combined with the computer on the sewing machine head will enable the pattern to be automatically modified into a zig-zag or any other desired pattern.

15. An apparatus for sewing thread into fabric comprising:
a. a first structure supporting a sewing machine head having a sewing needle and a source of thread;
b. a second structure supporting the fabric in a position relative to said sewing needle so that thread may be sewn into the fabric;
c. said second structure capable of horizontal movement in the X-direction, the Y-direction, or any combination X-Y direction relative to said sewing needle;
d. means for generating the horizontal movement of said second structure in the X-direction, the Y-direction, or any combination X-Y direction;
e. a video camera focused on the location of the intersection of said sewing needle and said fabric;
f. said video camera connected to a monitor;
g. a remote control apparatus for moving said second structure and the fabric retained thereon relative to said sewing needle so that said sewing needle may sew a pattern with said thread into said fabric;
h. a process controller having an X input and a Y input connected to said remote control apparatus, the process controller also connected to said means for generating horizontal movement of the second structure; and i. a source of power connected to said remote control apparatus and also connected to said process controller;

j. whereby an operator may view the needle sewing thread into the fabric on the video monitor and may control the movement of said second structure and fabric relative to the sewing needle by said remote control apparatus through generation of commands input into the process controller which in turn generates commands to said means for generating horizontal movement of the second structure.

16. An apparatus in accordance with claim 15 wherein said means for generating horizontal movement of the second structure further comprises:

a. a first motor to generate movement of said frame member in the X-direction;

b. an X axis controller connected to said first motor and also connected to an X input in said process controller;

c. a second motor to generate movement of said frame member in the Y-direction; and d. a Y axis controller connected to said second motor and also connected to a Y input in said process controller.

17. An apparatus in accordance with claim 15 wherein said process controller further comprises a memory to receive and store information of a pattern traced through the remote control apparatus, whereby the remote control apparatus can be used to trace a pattern to be sewn into the fabric, cause the second structure and the fabric thereon to move relative to the sewing needle to trace the selected pattern and further to mark locations where the pattern is to be sewn into the fabric, and the pattern and locations can be stored in the memory of the process controller to have the process controller subsequently cause the apparatus to sew the desired pattern at each marked location on the fabric.

18. An apparatus in accordance with claim 15 wherein said source of power is an alternating current source which is connected to an alternating current to direct current transformer which in turn is connected to the remote control apparatus and to the process controller.

19. An apparatus in accordance with claim 15 wherein said remote control apparatus is a joystick and a joystick controller, wherein the joystick is connected to the source of power and is also connected to the joystick controller which in turn is connected to the process controller through an X input and Y input of the process controller.

20. An apparatus in accordance with claim 15 further comprising a source of illumination focused on the intersection of said sewing needle and said fabric.

21. An apparatus in accordance with claim 20 wherein said source of illumination is attached to said first structure.

22. An apparatus in accordance with claim 15 wherein said video camera is movably attached to said first structure.

23. An apparatus in accordance with claim 15 wherein said video camera is a color video camera.

24. An apparatus in accordance with claim 23 wherein said monitor is a color monitor.

25. An apparatus in accordance with claim 15 wherein said video camera is equipped with a wide angle lens.

26. An apparatus in accordance with claim 15 wherein said fabric is a bedspread.

27. An apparatus in accordance with claim 15 wherein said fabric is a quilt.

28. An apparatus in accordance with claim 15 wherein said first structure and said structure are aligned such that said sewing needle is at the approximate center point of said fabric and said second structure can move relative to said first structure and said sewing needle so as to permit the sewing needle to reach any portion of the surface area of the fabric.

29. An apparatus in accordance with claim 15 wherein the speed of said sewing needle is controlled by said remote control apparatus.

30. An apparatus in accordance with claim 15 wherein said sewing machine head is equipped with a computer to control the sewing and stitching functions.

31. An apparatus in accordance with claim 30 wherein an operator can trace a straight-line pattern into the process controller and a software program in the process controller combined with the computer on the sewing machine head will enable the pattern to be automatically modified into a zig-zag or any other desired pattern.

32. The method of repetitively sewing a pattern into a fabric having a large surface comprising:

a. positioning a sewing machine head having a source of thread and a sewing needle relative to said fabric;

b. retaining said fabric on a movable structure which can be made to move in a horizontal direction relative to the sewing needle and which can cause a portion of the surface of the fabric to be reached by the sewing needle so that thread can be sewn into the fabric;

c. obtaining an electronically generated video image of the intersection of the sewing needle and fabric;

d. controlling the movement of the movable structure relative to the sewing needle by a remote control apparatus and determining the direction of movement based upon the video image of the intersection of the sewing needle and fabric; and e. storing the information on the movement of the movable structure into the memory of a process controller;

f. whereby the process controller can cause the movement of the movable structure relative to the sewing needle to be subsequently repeated at any multiplicity of locations on the fabric.

33. The method in accordance with claim 32, further comprising illuminating the intersection of said sewing needle and said fabric.

34. The method in accordance with claim 32, further comprising controlling the sewing and stitching functions through a separate computer in said sewing machine head.

35. The method in accordance with claim 34 comprising tracing a straight-line pattern into the process controller and automatically creating a modification of the pattern into a zig-zag or any other desired pattern through a software program in the process controller combined with the computer on the sewing machine head.

* * * * *